US 8,243,200 B2

(12) United States Patent
Chiu

(10) Patent No.: US 8,243,200 B2
(45) Date of Patent: *Aug. 14, 2012

(54) METHOD AND APPARATUS OF CONTENT ADAPTIVE DETAILING FILTERING FOR DIGITAL PICTURES

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,798

(22) Filed: Mar. 25, 2011

(65) Prior Publication Data

US 2011/0170010 A1    Jul. 14, 2011

Related U.S. Application Data

(63) Continuation of application No. 11/647,023, filed on Dec. 27, 2006, now Pat. No. 7,952,647.

(51) Int. Cl.
*H04N 5/21* (2006.01)
*H04N 5/208* (2006.01)

(52) U.S. Cl. ........................ 348/625; 348/607

(58) Field of Classification Search ................ 348/625, 348/630, 606, 607, 624; 345/611, 647; 382/254, 382/260, 263, 266, 275; *H04N 5/21, 5/208*
See application file for complete search history.

(56) References Cited

U.S. PATENT DOCUMENTS

| 4,446,484 | A | 5/1984 | Powell |
| 5,038,388 | A | 8/1991 | Song |
| 5,148,809 | A | 9/1992 | Biegeleisen-Knight et al. |
| 5,819,035 | A | 10/1998 | Devaney et al. |
| 6,229,578 | B1 | 5/2001 | Acharya et al. |
| 6,347,153 | B1 | 2/2002 | Triplett et al. |
| 6,771,833 | B1 | 8/2004 | Edgar |
| 7,724,308 | B2 | 5/2010 | Chang |
| 2008/0266307 | A1 | 10/2008 | Hofman |

FOREIGN PATENT DOCUMENTS

WO    WO-99/30547    6/1999

OTHER PUBLICATIONS

"PCT Search Report", PCT/US2007/088980, (Apr. 28, 2008).
"European Office Action", EP Application No. 07869991.5, (Mar. 15, 2012), 6 pages.

*Primary Examiner* — Sherrie Hsia
(74) *Attorney, Agent, or Firm* — Blakely, Sokoloff, Taylor & Zafman LLP

(57) ABSTRACT

According to one embodiment, a method is disclosed. The method includes receiving video data performing pre-filtering on the data, performing content analysis is applied to identify an area of the data, applying a two-dimensional (2-D) $2^{nd}$ gradient operation to extract a high frequency component and normalizing the high frequency component related to high frequency information from a previous picture.

20 Claims, 3 Drawing Sheets

X0 X1 X2 X3 X4
X5 X6 X7 X8 X9
Xa Xb Xc Xd Xe
Xf Xg Xh Xi Xj
Xk Xl Xm Xn Xo $2^{nd}$ Gradient = 8 * Xc - (X0+X2+X4+Xa+Xe+Xk+Xm+Xo)

METHOD AND APPARATUS OF CONTENT ADAPTIVE DETAILING FILTERING FOR DIGITAL PICTURES

CROSS REFERENCE TO RELATED APPLICATIONS

The present patent application is a Continuation application claiming priority to application Ser. No. 11/647,023, filed Dec. 27, 2006 now U.S. Pat. No. 7,952,647, which is allowed.

FIELD OF THE INVENTION

The present invention relates to computer systems; more particularly, the present invention relates to video processing.

BACKGROUND

Image enhancement is an important factor in the field of video processing. On the end user side of an image/video application, image enhancement techniques are typically applied as part of post-processing filtering to improve picture quality. Conventional media processors improve picture quality by magnifying the high frequency component to increase the detail/sharpness of picture content. Unfortunately, magnifying the high frequency component blindly will lead to undesirable picture quality due to the magnifying of the noise detail of picture content.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
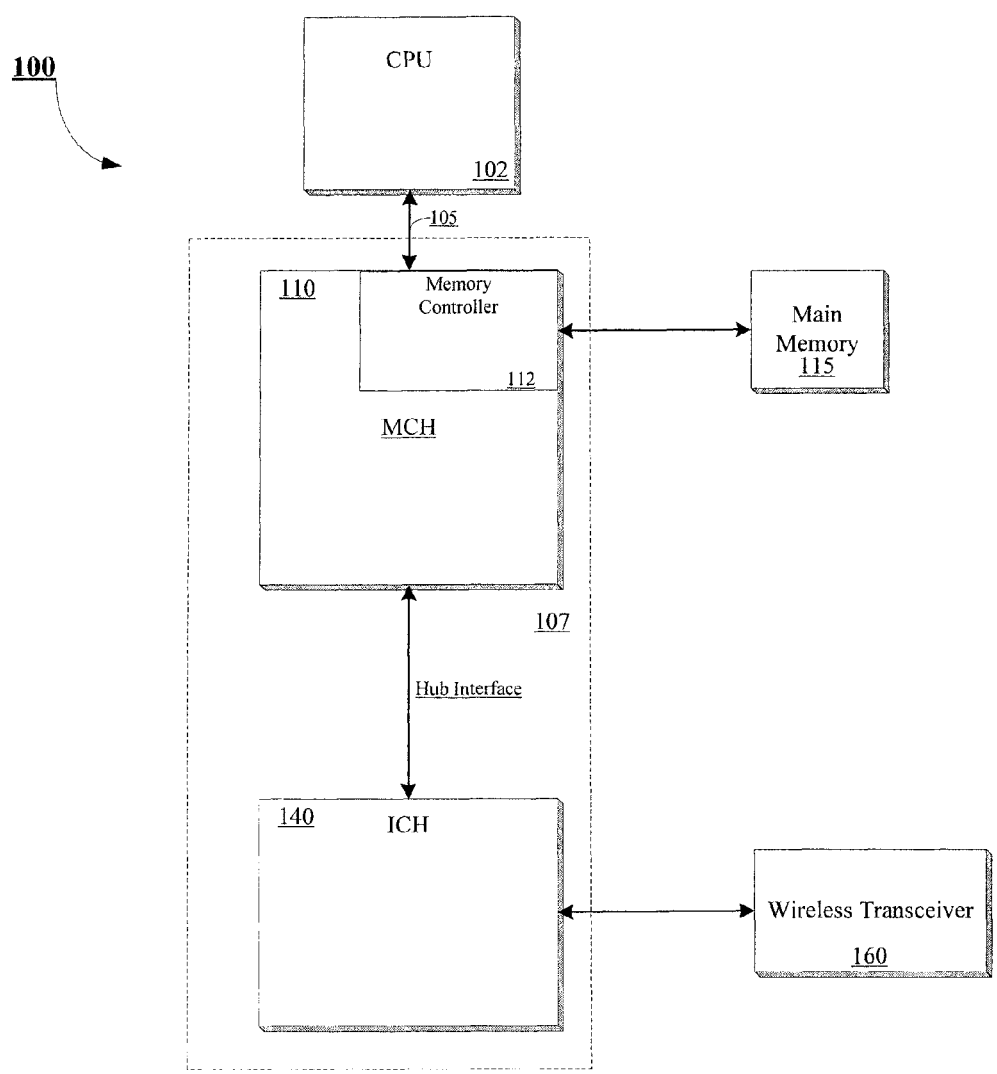
FIG. 1 is a block diagram of one embodiment of a computer system.

A content adaptive detail filtering mechanism is disclosed. In one embodiment, the mechanism includes components that are applied to a post-processing system in the areas of video, image, display and media processors. In one embodiment, the components include processes to enhance image/video visual quality by increasing picture detail/sharpness through content adaptive filtering; provide content analysis by utilizing edge detection and noise detection to adapt the use of detail filtering; provide better/accurate content analysis by utilizing the pre-process filtering to improve edge detection and noise detection; provide detail filtering by a proposed two-dimensional (2-D) $2^{nd}$ derivative formula to extract high frequency component; provide detail filtering by normalizing the filtering amount by a maximum of a high frequency component detected from a previous picture; provide detail filtering by modifying a filtering amount by a noise detection or a portion of the maximum of the high frequency component detected from the previous picture; and provide detail filtering by allowing end users to specify a filtering gain factor to modify a filtering amount to achieve a user preference.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), FIG. 1 is a block diagram of one embodiment of a computer system 100. Computer system 100 includes a central processing unit (CPU) 102 coupled to interconnect 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented multiple processors, or multiple processor cores.

In a further embodiment, a chipset 107 is also coupled to interconnect 105. Chipset 107 may include a memory control component (MC) 110. MC 110 may include a memory controller 112 that is coupled to a main system memory 115. Main system memory 115 stores data and sequences of instructions that are executed by CPU 102 or any other device included in system 100.

MC 110 may be coupled to an input/output control component (IC) 140 via a hub interface. IC 140 provides an interface to input/output (I/O) devices within computer system 100. IC 140 may support standard I/O operations on I/O interconnects such as peripheral component interconnect (PCI), accelerated graphics port (AGP), universal serial interconnect (USB), low pin count (LPC) interconnect, or any other kind of I/O interconnect (not shown). In one embodiment, ICH 140 is coupled to a wireless transceiver 160.

According to one embodiment, IC 140 includes an instruction set to perform a content adaptive detail filtering of video data. However in other embodiments, IC 140 may include hardware modules to perform the process. In further embodiments, CPU 102 may be implemented to perform the process.

Figure 2:
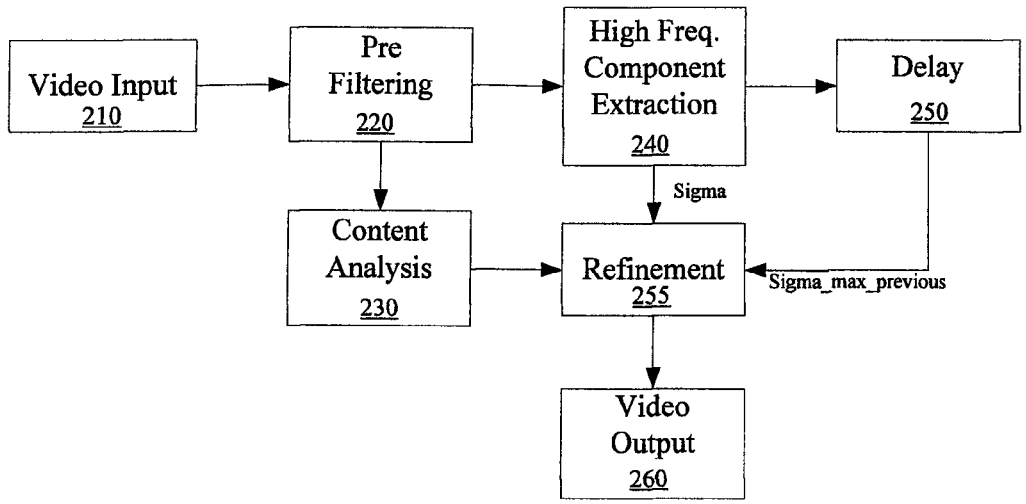
FIG. 2 is a flow diagram illustrating one embodiment for performing detail filtering.

FIG. 2 is a flow diagram illustrating one embodiment for performing detail filtering. At processing block 210, a video input is received. At processing block 220, pre-filtering is performed to smooth a picture. At processing block 230, content analysis is applied to identify an area of interest such as edge region. At processing block 240, a 2-D $2^{nd}$ gradient operation is applied to extract a high frequency component.

At processing block 250, the high frequency component is normalized related to the same high frequency information from a previous picture. At processing block 255, the adjustment amount is refined by a result of edge detection. At processing block 260, the processed video data is transmitted from ICH 140. The individual processes 220-255 are described below in greater detail.

Figure 3:
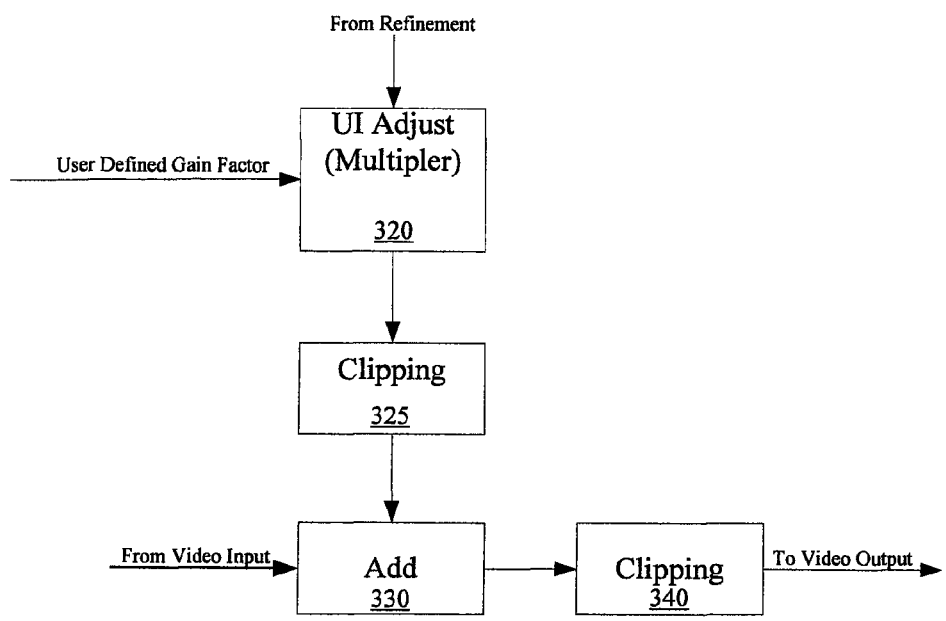
FIG. 3 is a flow diagram illustrating a further embodiment for performing detail filtering.

According to a further embodiment, a parameter setting is provided for users to select a refinement amount to a user's preference. FIG. 3 is a flow diagram illustrating a further embodiment for performing detail filtering incorporating user preferences. At processing block 320, a multiplier is applied to the refined value to provide an adjustment based upon a gain factor defined by a user. At processing block 325, clipping is performed. In one embodiment, the clipping is based upon the local maximum and local minimum of 3×3 neighborhood pixels processed during detail filtering. At processing block 330, the adjusted value is added to the video input. At processing block 340, a second clipping operation is performed prior to forwarding to the video output.

Pre-Filtering

The use of a low pass pre-processor to remove noise improves the accuracy of picture analysis. According to one embodiment, a 2-D pre-edge filter is implemented with a weighting w. In a further embodiment, the 2-D filter may be decomposed into two 1-D filters to reduce the number of operations. This can be represented as:

$$\text{Pre\_edge\_filter\_weighing } w = \begin{bmatrix} 1 & 2 & 1 \\ 2 & 4 & 2 \\ 1 & 2 & 1 \end{bmatrix} = \begin{bmatrix} 1 \\ 2 \\ 1 \end{bmatrix} * [1 \ 2 \ 1] \quad [1]$$

Considering a target pixel x with 3×3 neighborhood pixels, NH9(x), the output of the pre-edge-filter is represented by:

$$\text{pre\_edge\_filter\_output} = \left(\frac{1}{\sum_{x \in NH9(x)} w(x)}\right) \cdot \left(\sum_{x \in NH9(x)} w(x) \cdot x + 1/2 \cdot \sum_{x \in NH9(x)} w(x)\right) \quad [2]$$

In Equation 2 above, the $\Sigma w(x)=16$ for the summation of the pre_edge_filter_weighting in the Equation 1. The last term, $\frac{1}{2} \cdot \Sigma w(x)$, is used for the rounding purpose. The above formula is included in this embodiment due to the simply complexity. However in other embodiments, other pre-processor techniques may be applied.

Content Analysis—Edge Protection

According to one embodiment, edge detection is used as the content analysis process to identify a pixel of interest to be applied for detail filtering. In such an embodiment, a Sobel edge operator, shown below, is applied as the edge detection process in four directions.

$$E\_h = \begin{bmatrix} -1 & -2 & -1 \\ 0 & 0 & 0 \\ 1 & 2 & 1 \end{bmatrix} \quad E\_v = \begin{bmatrix} -1 & 0 & 1 \\ -2 & 0 & 2 \\ -1 & 0 & 1 \end{bmatrix} \quad [3]$$

$$E\_P45 = \begin{bmatrix} -2 & -1 & 0 \\ -1 & 0 & 1 \\ 0 & 1 & 2 \end{bmatrix} \quad E\_N45 = \begin{bmatrix} 0 & -1 & -2 \\ 1 & 0 & -1 \\ 2 & 1 & 0 \end{bmatrix}$$

The edge metric (EM) for the target pixel x is formulated as the convolution of the weighting in the Equation 3 with its 3×3 neighborhood NH9(x) as $$EM(x)=|NH9(x)*E\_h|+|NH9(x)*E\_v|=|NH9(x)*E\_P45|+|NH9(x)*E\_N45| \quad [4]$$

According to one embodiment, the use of two directions, (e.g., E_v, and E_h) may be sufficient for most applications. The detection at 45 degrees further improves the edge detection with more computational complexity.

High Frequency Component Extraction

Figures 4, 5:
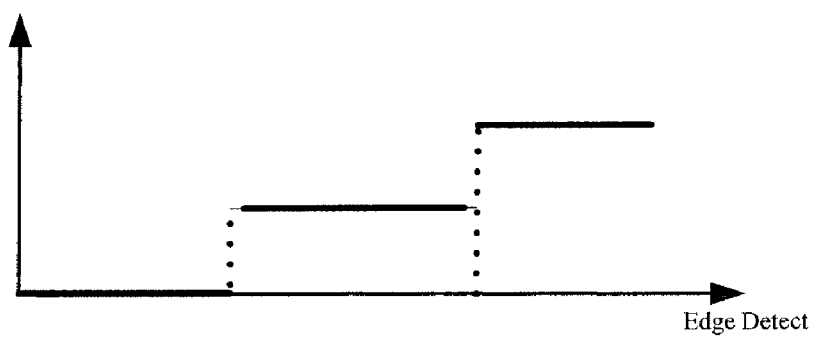
FIG. 4 illustrates one embodiment of an equation and location of pixels for a high frequency component extraction process for a central target pixel.
FIG. 5 illustrates one embodiment of a graph mapping edge detection versus filtering weighting over conventional edge detection measures.

In one embodiment, the 2-D formula shown above in Equation 5 is used to extract the high frequency component. FIG. 4 illustrates the high frequency component. As shown in FIG. 4, the high frequency component is denoted as the sigma for the central pixel Xc $$\text{2nd\_gradient} = \begin{bmatrix} -1 & 0 & -1 & 0 & -1 \\ 0 & 0 & 0 & 0 & 0 \\ -1 & 0 & 8 & 0 & -1 \\ 0 & 0 & 0 & 0 & 0 \\ -1 & 0 & -1 & 0 & -1 \end{bmatrix} \quad [5]$$

Refinement

The refinement process includes two modification processes: normalization & edge adaptive. In one embodiment, the Sigma(Xc) is normalized by the maximum of the sigma value of the previous picture, sigma_max_previous, such that:

$$\text{Temp\_sigma}(Xc) = C^*(\text{sigma}(Xc)/\text{sigma\_max\_previous} - \text{delta}) \quad [7]$$

In one embodiment, the parameter C, which may be specified by users, is a weighting coming from the edge detection. In such an embodiment, pixels are classified as being a strong edge pixel, weak edge pixel and non-edge pixel. Subsequently, the C value is assigned according to the edgeness property of the pixel. FIG. 5 illustrates one embodiment of a graph mapping edge detection versus filtering weighting over conventional edge detection measures. As shown in FIG. 5, the low edge pixels are not modified by the high frequency measure.

The delta in Equation 7 is a threshold to the high frequency component extraction above in which the modification is added to reconstruction. In one embodiment, this process is set by a noise detection level. However, such a process is not described herein so as not to provide confusion as to the scope of this invention. Thus, in this embodiment, 10% of sigma_max_previous is used as the threshold value.

User Preferences

As discussed above, may be provided by allowing end users to specify a filtering gain factor to modify a filtering amount to achieve a user preference. In such an embodiment, the amount of adjustment results in a final adjustment that is represented in Equation 8 as:

$$\text{Final\_sigma}(Xc) = K^* \text{Temp\_sigma}(Xc) \quad [8]$$

In one embodiment, the parameter K is a constant selected by a user. Further, represented in Equation 9 as:

$$\text{Output}(Xc) = \text{clipping}(Xc + \text{Final\_sigma}(Xc)) \quad [9]$$

Where clipping$(x)$=255 if $x$>255, clipping$(x)$= 0 if $x$<0, otherwise, clipping$(x)$=$x$.

The above-described mechanism achieves improved picture quality by utilizing the local spatial content information with the edge detection to adapt high frequency component adjustment to provide graceful enhancement of picture detail. Further, the pre-filtering process extracts more reliable high frequency components and more accurate content analysis. In addition, an effective high frequency component extraction clipping is applied to avoid underfloor or overflow in producing the output process implements a two-Dimensional $2^{nd}$ derivative formula to filter out the high frequency component to illustrate the detail of picture. Moreover, users are permitted to configure for various applications by allowing the user to specify a gain factor to achieve a user desirable viewing experience.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    applying a two-dimensional (2-D) $2^{nd}$ gradient operation to extract a high frequency component from video data; and
    normalizing the high frequency component related to high frequency information from a previous picture.

2. The method of claim 1 wherein normalizing the high frequency component comprises using an edge adaptive modification process to classify pixel data as strong edge pixels, weak edge pixels and non-edge pixels.

3. The method of claim 1 further comprising performing content analysis to identify an area of the data prior to applying the 2-D $2^{nd}$ gradient operation.

4. The method of claim 3 wherein performing content analysis comprises using an edge detection operation to identify a pixel of interest to be applied for detail filtering.

5. The method of claim 4 wherein the edge detection operation is a Sobel edge operation.

6. The method of claim 3 further comprising performing pre-filtering on the video data prior to performing the content analysis.

7. The method of claim 6 wherein performing the pre-filtering comprises using a 2-D filter to remove noise from the data.

8. The method of claim 7 wherein the 2-D filter is decomposed into two 1-D filters to reduce a number of operations.

9. The method of claim 1 further comprising receiving one or more user defined parameters to provide detail filtering to achieve a user preference.

10. The method of claim 9 wherein the user defined parameters include a filtering gain factor.

11. A processor comprising:
    a component to apply a two-dimensional (2-D) $2^{nd}$ gradient operation to extract a high frequency component from video data; and
    a component to normalize the high frequency component related to high frequency information from a previous picture.

12. The processor of claim 11 wherein the component to normalize comprises an edge adaptive modification process to classify pixel data as strong edge pixels weak edge pixels and non-edge pixels.

13. The processor of claim 11 further comprising a component to perform content analysis to identify an area of the data prior to applying the 2-D $2^{nd}$ gradient operation.

14. The processor of claim 11 further comprising a component to perform pre-filtering on the video data prior to performing the content analysis.

15. An article of manufacture including one or more computer readable media that embody a program of instructions, wherein the program of instructions, when executed by a processing unit, causes the processing unit to perform the process of:
    applying a two-dimensional (2-D) $2^{nd}$ gradient operation to extract a high frequency component from video data; and
    normalizing the high frequency component related to high frequency information from a previous picture.

16. The article of manufacture of claim 15 wherein when executed by a processing unit, further causes the processing unit to perform the process of receiving one or more user defined parameters to provide detail filtering to achieve a user preference.

17. The article of manufacture of claim 16 wherein the user defined parameters includes a filtering gain factor.

18. The article of manufacture of claim 15 wherein normalizing the high frequency component comprises using an edge adaptive modification process to classify pixel data as strong edge pixels, weak edge pixels and non-edge pixels.

19. The article of manufacture of claim 15 wherein when executed by a processing unit, further causes the processing unit to perform the process of performing content analysis to identify an area of the data prior to applying the 2-D $2^{nd}$ gradient operation.

20. The article of manufacture of claim 19 wherein when executed by a processing unit, further causes the processing unit to perform the process of performing pre-filtering on the video data prior to performing the content analysis.

* * * * *